United States Patent [19]

Sherwood et al.

[11] Patent Number: 5,124,046
[45] Date of Patent: Jun. 23, 1992

[54] METHOD FOR CONTROLLING CALCIUM CARBONATE SCALING IN HIGH PH AQUEOUS SYSTEMS

[75] Inventors: Nancy S. Sherwood; Monica A. Yorke, both of Coraopolis, Pa.

[73] Assignee: Calgon Corporation, Pittsburgh, Pa.

[21] Appl. No.: 615,828

[22] Filed: Nov. 16, 1990

Related U.S. Application Data

[63] Continuation of Ser. No. 339,569, Apr. 18, 1989, abandoned, which is a continuation of Ser. No. 80,854, Aug. 3, 1987, abandoned.

[51] Int. Cl.$^5$ ............................................. C02F 5/14
[52] U.S. Cl. ................................. 210/699; 210/701; 252/180
[58] Field of Search .................. 210/698–701; 252/180, 181

[56] References Cited

U.S. PATENT DOCUMENTS

| | | | |
|---|---|---|---|
| 3,928,196 | 12/1975 | Persinski et al. | 252/180 |
| 4,536,292 | 8/1985 | Matz | 210/701 |
| 4,618,448 | 10/1986 | Cha et al. | 210/698 |
| 4,634,532 | 1/1987 | Logan et al. | 210/698 |
| 4,640,793 | 2/1987 | Persinski et al. | 210/699 |
| 4,680,135 | 7/1987 | Cha et al. | 210/698 |
| 4,933,090 | 6/1990 | Gill et al. | 210/700 |
| 5,078,879 | 1/1992 | Gill et al. | 210/699 |

FOREIGN PATENT DOCUMENTS 58-84794  5/1982  Japan .

*Primary Examiner*—Thomas Wyse
*Attorney, Agent, or Firm*—W. C. Mitchell; C. M. Caruso

[57] ABSTRACT

Compositions containing a water soluble carboxylic-/sulfonic/polyoxyalkylene terpolymer and a water soluble phosphonate effectively control calcium carbonate scaling in aqueous systems under severe pH, alkalinity, calcite saturation and/or temperature conditions.

4 Claims, No Drawings

METHOD FOR CONTROLLING CALCIUM CARBONATE SCALING IN HIGH PH AQUEOUS SYSTEMS

This is a continuation of application Ser. No. 339,569 filed Apr. 18, 1989, abandoned, which is a continuation of Ser. No. 080,854 filed Aug. 3, 1987, abandoned.

BACKGROUND OF THE INVENTION

U.S. Pat. No. 3,928,196 discloses the use of copolymers of 2-acrylamido-2-methylpropylsulfonic acid and acrylic acid as scale inhibitors.

U.S. Pat. No. 4,640,793 discloses admixtures containing carboxylic acid/sulfonic acid polymers as scale and corrosion inhibitors.

U.S. Pat. No. 4,618,448 discloses the use of polymers comprising an unsaturated carboxylic acid, an unsaturated sulfonic acid and an unsaturated polyalkylene oxide as scale inhibitors.

Japanese No 57-084794 discloses the use of copolymers of acrylic acid and allyl polyethylene glycol as scale inhibitors.

European patent application 84301450.7 discloses carboxylic acid/sulfonic acid copolymers in combination with organic phosphonates as scale inhibitors.

The above listed references do not disclose or suggest the criticality of pH, alkalinity, calcite saturation and/or temperature with respect to the control of calcium carbonate scaling. Therefore, these references do not disclose or suggest the instant invention, which relates to the control of calcium carbonate scaling under severe pH, alkalinity, calcite saturation and/or temperature conditions.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reactions products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, or the introduction of additional ions which form insoluble compounds with the ions already present in the solution.

As these reaction products precipitate on surfaces of a water carrying system, they form scale or deposits. This accumulation prevents effective heat transfer, interferes with fluid flow, facilitates corrosive processes and harbors bacteria. This scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Since chelation is a stoichiometric reaction, it necessitates adding stoichiometric amounts of a chelating or sequestering agent relative to the cation concentration. These amounts are not always desirable or economical.

Almost 50 years ago, it was discovered that certain inorganic polyphosphates will prevent such precipitation when added in amounts far less than the concentrations needed for sequestering or chelating. By polyphosphates, we mean phosphates having a molar ratio of metal oxide: $P_2O_5$ between 1:1 and 2:1.

When a precipitation inhibitor is present in a potentially scale-forming system at a markedly lower concentration than that required for stoichiometric binding of the scale-forming cation, it is said to be present in "threshold" amounts. See for example, Hatch and Rice, "Industrial Engineering Chemistry", Vol. 31, pages 51 to 53 (Jan. 1939); Reitemeier and Buehrer, "Journal of Physical Chemistry", Vol. 44, No. 5, pages 535 to 536 (May, 1940); Fink and Richardson, U.S. Pat. No. 2,358,222; and Hatch, U.S. Pat. No. 2,539,305.

Generally, sequestration takes place at weight ratios of threshold active compound to scale-forming cation components of greater than about 10:1, depending on the anion components in the water. Threshold inhibition generally takes place at weight ratios of threshold active compound to scale-forming cation components of less than about 0.5:1.0.

Certain water soluble polymers, including groups derived from acrylamide and acrylic acid, have been used to condition water containing scale-forming cation components of less than about 0.5:1.0.

Under high pH and/or alkalinity conditions, the precipitation of calcium carbonate in aqueous systems is especially difficult to control. Generally, operators add acid to lower the pH and consume alkalinity to prevent calcium carbonate scaling. This is necessary since traditional scale inhibitors for calcium carbonate, such as hydroxyethylidene diphosphonic acid (HEDP), are ineffective in highly alkaline waters. For example, HEDP is ineffective because it reacts with calcium at high pH's to form a calcium/phosphonate scale.

The inventors have discovered a method for controlling calcium carbonate scaling in an aqueous system having high pH, alkalinity and/or calcite saturation values utilizing compositions which contain water soluble polymers prepared using carboxylic acid, sulfonic acid and polyalkaline oxide moieties and water soluble phosphonates. Optionally, water soluble carboxylic polymers may be added. Alone, none of the components provide high threshold inhibition (less than 90%), regardless of dosage. The instant compositions, however, provide greater than 90% threshold inhibition in severe waters.

DETAILED DESCRIPTION OF THE INVENTION

The instant invention is directed to a method for inhibiting calcium carbonate scaling in a highly alkaline aqueous system comprising adding to said system an effective amount of a composition comprising:
(A) a water soluble polymer having an intrinsic viscosity of 0.05 to 2.5 dl/g, prepared from:
  (a) 35 to 90%, by weight, of an unsaturated carboxylic acid, or its salt;
  (b) 5 to 40%, by weight, of an unsaturated sulfonic acid, or its salt; and
  (c) 5 to 40%, by weight, of an unsaturated polyalkaline oxide compound;
(B) a water soluble phosphonate; and
(C) a polymer selected from the group consisting of: homopolymers of acrylic acid and salts thereof, homopolymers of methacrylic acid, and salts thereof;

polymers comprising acrylic acid and methacrylic acid, and salts thereof; and hydrolyzed polyacrylamides, and salts thereof;
wherein said aqueous system has a pH ranging from about 7.5 to about 11.0, preferably about 8.0 to about 10.0, a bicarbonate alkalinity greater than about 100 mg/L, preferably from about 100 to about 1,000 mg/L $HCO_3^-$, a calcium concentration from about 10 to about 5000 mg/L, preferably about 10 to about 2000 mg/L, and a temperature of about 20 to about 90° C., preferably about 30° to about 80° C.; and wherein component A comprises from about 10 to about 90%, by weight, of said composition, component B comprises from about 10 to about 90%, by weight, of said composition and component C comprises 0 to about 40%, by weight, of said composition.

While component C is optional, the preferred compositions contain 20–60%, by weight, of A, 20–60%, by weight, of B, and 5–30%, by weight, of C.

The above described compositions are also claimed.

An effective amount of the instant compositions should be added to the aqueous system being treated. As used herein, the term "effective amount" is that amount of an instant composition necessary to inhibit the scaling of calcium carbonate under severe pH, alkalinity, calcite saturation and/or temperature conditions. Generally, the effective amount will range from about 1 to about 200 ppm of the total composition, on an active basis, based on the total weight of the aqueous system being treated, preferably from about 10 to about 200 ppm.

As used herein, the term "inhibiting calcium carbonate" is meant to include threshold precipitation inhibition, stabilization, dispersion, solubilization, and/or particle size reduction. Thus, the inventors have discovered that the instant compositions synergistically inhibit, minimize or prevent calcium carbonate scaling under severe operating conditions, and intend that the instant specification describe this phenomena, without attempting to describe the specific mechanism by which calcium carbonate scaling is prevented or minimized.

The term "aqueous system", as used herein, is meant to include any type of industrial system containing water, including, but not limited to, cooling water systems, boiler water systems, desalinations systems, gas scrubber water systems, blast furnace water systems, reverse osmosis systems, evaporator systems, paper manufacturing systems, mining systems and the like.

For the polymer of component A, any unsaturated carboxylic acid or salt may be used to prepare the polymer. Examples include acrylic acid, methacrylic acid, -halo acrylic acid, maleic acid, itaconic acid, vinyl acetic acid, allyl acetic acid, fumaric acid, -carboxyethyl acrylate, their salts and admixtures thereof. The preferred carboxylic acids are acrylic acid and methacrylic acid and their salts.

Any unsaturated sulfonic acid or salt thereof may be used to prepare the polymer of component A. Examples include 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl sulfonic acid, methallyl sulfonic acid, 3-methacrylamido-2-hydroxy propyl sulfonic acid acrylate, their salts and mixtures thereof. The most preferred sulfonic compounds are 2-acrylamido-2-methylpropylsulfonic acid, 2-methacrylamido-2-methylpropylsulfonic acid and their salts.

Any unsaturated polyalkylene oxide compound may be used to prepare the polymers of component A. Examples include allyl polyethylene glycol, methallyl polyethylene glycol, polyethylene glycol acrylate, polyethylene glycol methacrylate, methoxy allyl polyethylene oxide, alkoxyallyl polyethylene oxide and the polypropylene equivalents thereof. Also, mixtures of polyethers formed from polyethylene oxide with other polyalkylene oxides, such as propylene or butylene oxide may be used. The polyether chain may be capped with an alkyl, aralkyl, sulfonate or phosphonate group metal or ion, or uncapped.

Mixtures of the various monomers may be used, and nonionic monomers (such as acrylamide, methacrylamide and acrylonitrile) may also be present in the polymers. However, terpolymers are preferred.

These polymers are prepared using 35 to 90%, preferably 50–70%, by weight, of the unsaturated carboxylic acid or salt thereof; 5 to 40%, preferably 10–40%, by weight, of the unsaturated sulfonic acid or salt thereof; and 5 to 40%, preferably 10–30%, by weight, of an unsaturated polyalkylene oxide compound.

These polymers, and the manufacture thereof, are described in further detail in U.S. Pat. No. 4,618,448, which is hereby incorporated into this specification by reference.

The preferred polymers for component A are water soluble polymers having an intrinsic viscosity of 0.05 to 2.5 dl/g, prepared from:
(a) 35 to 90%, by weight, of an unsaturated carboxylic compound selected from the group consisting of acrylic acid, methacrylic acid, their salts and mixtures thereof;
(b) 5 to 40%, by weight, of an unsaturated sulfonic compound selected from the group consisting of 2-acrylamido-2-methylpropyl sulfonic acid, 2-methacrylamido-2-methylpropylsulfonic acid, their salts and mixtures thereof; and
(c) 5 to 40%, by weight, of allylmethoxypolyethylene glycol.

Most preferably, component A is 50 to 70%, by weight, acrylic acid or its salt; 10 to 40%, by weight, 2-acrylamido-2-methylpropylsulfonic acid, or its salt; and 10 to 30%, by weight, allyl-methoxypolyethylene glycol, wherein the intrinsic viscosity is about 0.05 to about 0.5 dl/g.

For component B, any water soluble phosphonate may be used, including, but not limited to, hexamethylene diamine tetra(methylene phosphonic acid), 2-phosphonobutane-1, 2, 4-tricarboxylic acid, bis-hexamethylene triamine phosphonic acid, 1-hydroxy ethylidene 1-1-diphosphonic acid acid, amino tri (methylene phosphonic acid), phosphonosuccinic acid, benzene phosphonic acid, 2-aminoethylphosphonic acid, polyamino phosphonates and the like. Additional phosphonates are identified in U.S. Pat. No. 3,837,803, which is hereby incorporated into this specification by reference. The preferred phosphonates are 2-phosphonobutane-1, 2, 4-tricarboxylic acid, amino tri(methylenephosphonic acid), 1-hydroxy ethylidene 1-1-diphosphonic acid, hexamethylene diamine tetra(methylene phosphonic acid) and bis-hexamethylene triamine phosphonic acid. The most preferred and most effective water soluble phosphonates for use with component A under adverse operating conditions are hexamethylene diamine tetra(methylene phosphonic acid), bis-hexamethylene triamine phosphonic acid and 2-phosphonobutane-1, 2, 4-tricarboxylic acid.

The use of components A and B is critical to the instant method in that compositions comprising these components minimize or prevent calcium carbonate scaling under severe pH, alkalinity, calcite saturation and/or temperature conditions. These compositions provide at least 90% threshold inhibition of calcium carbonate; this level of inhibition cannot be obtained using the components of the instant compositions individually.

Optionally, component C may be added. Component C is a water soluble polycarboxylate selected from the group consisting of polymers prepared from acrylic acid, methacrylic acid, vinyl acetic acid, allyl acetic acid, fumaric acid, maleic acid or anhydride, itaconic acid, alpha-halo acrylic acid and beta-carboxyethyl acrylate. Preferably, component C is selected from the group consisting of water soluble homopolymers of acrylic acid, water soluble homopolymers of methacrylic acid, water soluble polymers of acrylic acid and methacrylic acid, and hydrolyzed polyacrylamides, wherein the molecular weight is less than about 25,000, preferably about 1,000 to about 20,000.

The inventor has found that the addition of component C to the instant compositions further enhances the benefits of the instant compositions on calcium carbonate scaling in severe aqueous systems.

The compositions disclosed herein effectively control calcium carbonate scaling in cooling water systems which have high calcite saturation, high pH and/or high alkalinity values. Such conditions are often times encountered as cycles of concentration increase. Thus, the instant compositions provide calcium carbonate inhibition under severe conditions where conventional calcium carbonate inhibitors such as HEDP and AMP are ineffective.

Additionally, other conventional water treatment agents, including corrosion inhibitors such as tolyltriazole, can be used with the instant compositions and method.

EXAMPLES

The following examples demonstrate the efficacy of the instant compositions under severe conditions. These examples are not intended to limit the scope of this invention in any way.

Calcium Carbonate Inhibition

Calcium carbonate inhibition was determined by adding a given concentration of the designated inhibitor to a solution containing 250 mg/L $Ca^{+2}$ (as $CaCl_2$) and 600 mg/L of alkalinity as $HCO_3^{-1}$, at initial pH of 9.0. The solution was stored in a stagnant flask for 24 hours at 55° C. Poor performing inhibitors allow a precipitate of $CaCO_3$ to form. To remove these "solids" the solution is filtered through a 2.5 micron filter. The inhibitor effectiveness under these conditions is obtained by determination of the soluble calcium content of the test solutions using the Schwarzenbach titration method (EDTA, chrome black T indicator). The soluble calcium ion concentration in the absence of inhibitor is equivalent to 0% scale inhibition. The percent inhibition for a given test is determined by:

Vo = the Schwarzenbach titration volume with no inhibitor present (control)
Vt = the Schwarzenbach titration volume when no precipitation occurs
Ve = the experimental Schwarzenbach titration volume when inhibitors are present in the test solution Results are shown in Table 1.

TABLE 1

| Example No. | Inhibitor | Dosage (ppm) | % Inhibition |
|---|---|---|---|
| 1 | 2-phosphonobutane-1,2,4 tricarboxylic acid | 10 | 75 |
| 2 | 2-phosphonobutane-1,2,4 tricarboxylic acid | 20 | 74 |
| 3 | Hexamethylenediamine tetra(methylene phosphonic acid) | 10 | 79 |
| 4 | hexamethylenediamine tetra(methylene phosphonic acid) | 20 | 86 |
| 5 | 1-hydroxy ethylidene-1-diphosphonic acid | 10 | 64 |
| 6 | 1-hydroxy ethylidene-1-diphosponic acid | 20 | 64 |
| 7 | *AA/AMPSA/Allylmethoxy PEG | 20 | 44 |
| 8 | *AA/AMPSA/Allylmethoxy PEG | 50 | 44 |
| 9 | AA/AMPSA/Allylmethoxy PEG + 2-phosphonobutane-1,2,4 tricarboxylic acid | 10/10 | 84 |
| 10 | AA/AMPSA/Allylmethoxy PEG + 2-phosphonobutane-1,2,4 tricarboxylic acid | 20/20 | 91 |
| 11 | AA/AMPSA/Allylmethoxy PEG + hexamethylene diamine tetra (methylene phosphonic acid) | 20/20 | 92 |
| 12 | AA/AMPSA/Allylmethoxy PEG + 2-phosphonobutane-1,2,4 tricarboxylic acid + polyacrylic acid (MW = approximately 2000) | 3/3/1.5 | 81 |
| 13 | AA/AMPSA/Allylmethoxy PEG + 2-phosphonobutane-1,2,4 tricarboxylic acid + polyacrylic acid (MW = approximately 2000) | 4/4/2 | 91 |
| 14 | AA/AMPSA/Allylmethoxy PEG + 2-phosphonobutane-1,2,4 tricarboxylic acid + polyacrylic acid (MW = approximately 2000) | 5/5/2.5 | 95 |

*AA/AMPSA/Allylmethoxy PEG is a 70/20/10 (by weight) acrylic acid/2-acrylamido-2-methylpropyl sulfonic acid/allylmethoxypolyethylene glycol polymer having an approximate intrinsic viscosity of 0.15 dl/g.
(AMPS is a registered trademark of The Lubrizol Corporation.)

What we claim is:

1. A method for inhibiting calcium carbonate scaling in an aqueous system operating under severe pH, alkalinity and/or calcite saturation conditions comprising adding to said system an effective amount of a composition comprising:

(A) about 10 to 90%, by weight, of a water soluble polymer having an intrinsic viscosity of 0.05 to 2.5 dl/g, prepared from:
  a) 35 to 90%, by weight, of an unsaturated carboxylic acid selected from the group consisting of acrylic acid, methacrylic acid and salts thereof;
  b) 5 to 40% by weight, of an unsaturated sulfonic acid selected from the group consisting of 2-acrylamido-2-methylpropyl sulfonic acid, 2-methacrylamido-2-methylpropyl sulfonic acid and salts thereof; and
  c) 5 to 40%, by weight, of allyl methoxypolyethylene glycol;

(B) about 10 to 90%, by weight, of a water soluble phosphonate selected from the group consisting of 2-phosphonobutane-1,2,4-tricarboxylic acid and hexamethylene diamine tetra (methylene phosphonic acid); and (C) 0 to about 40% of a water-soluble polymer having a molecular weight less than about 25,000 selected from the group consisting of: homopolymers of acrylic acid and salts thereof, homopolymers of methacrylic acid and salts thereof, polymers comprising acrylic acid and methacrylic acid and salts thereof, and hydrolyzed polyacrylamides and salts thereof;

wherein said aqueous system has a pH ranging from about 7.5 to about 11.0, a bicarbonate alkalinity greater than about 100 mg/L and a calcium ion concentration of from about 10 to about 5000 mg/L.

2. The method of claim 1, wherein A is about 20 to 60%, by weight, B is about 20 to 60%, by weight, and C is about 5 to 30%, of said composition.

3. The method of claim 1, wherein said effective amount is from about 1 to about 200 ppm.

4. The method of claim 3, wherein said pH is about 8.0–10.0 and said alkalinity is about 100–1000 mg/L $HCO_3$.

* * * * *